F. KERIAN.
DRILL SHOE.
APPLICATION FILED MAR. 5, 1912.
1,047,816.
Patented Dec. 17, 1912.
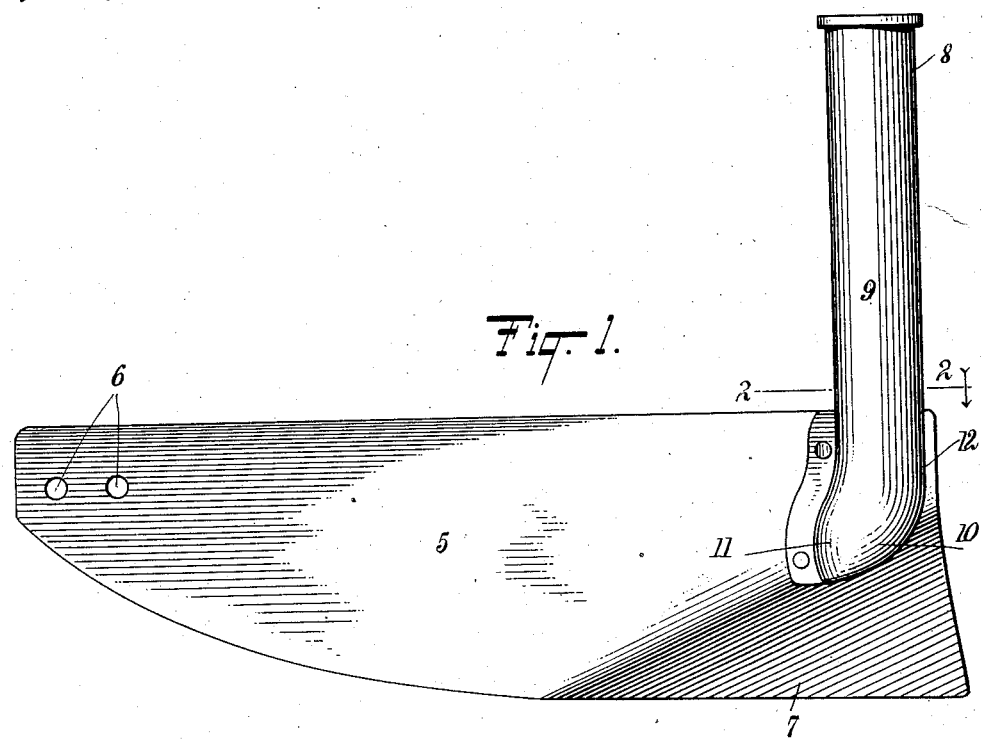
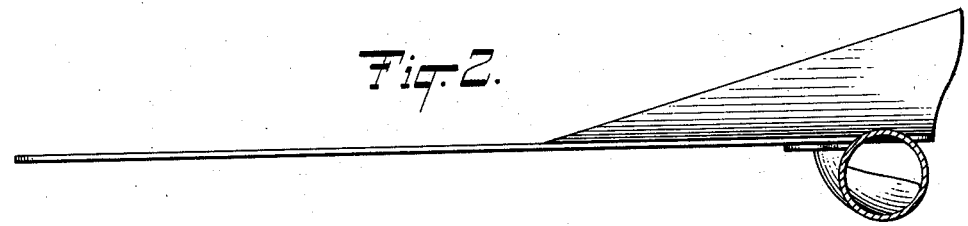
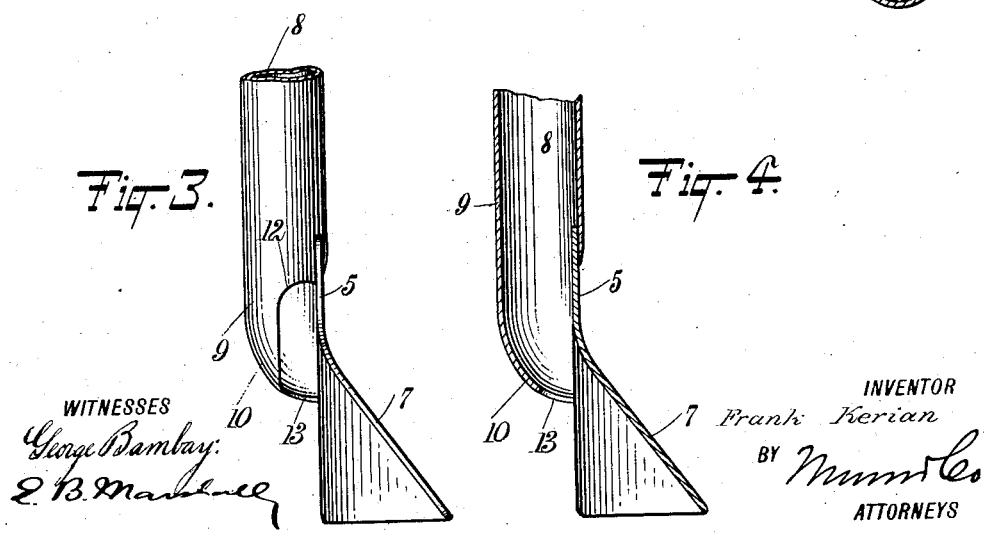
WITNESSES
George Bambay
E. B. Marshall
INVENTOR
Frank Kerian
BY Munn & Co
ATTORNEYS

UNITED STATES PATENT OFFICE.

FRANK KERIAN, OF GRAFTON, NORTH DAKOTA.

DRILL-SHOE.

1,047,816.  Specification of Letters Patent.  Patented Dec. 17, 1912.

Application filed March 5, 1912. Serial No. 681,721.

*To all whom it may concern:*

Be it known that I, FRANK KERIAN, a citizen of the United States, and a resident of Grafton, in the county of Walsh and State of North Dakota, have invented a new and Improved Drill-Shoe, of which the following is a full, clear, and exact description.

My invention relates to drill shoes, and it has for its object to provide one having an elongated body with its rear flared at the bottom, and a seed spout secured to the body with its bottom bent for directing the seed under the flared portion of the shoe. The seed spout is open at its rear end and closed at its front end, to prevent its being clogged with dirt.

Additional objects of the invention will appear in the following complete specification in which the preferred form of the invention is disclosed.

In the drawings similar characters of reference indicate corresponding parts in all the views, in which—

Figure 1 is a side elevation of the drill and seed spout; Fig. 2 is a sectional view on the line 2—2 of Fig. 1; Fig. 3 is a rear view of the drill, and a portion of the seed spout; and Fig. 4 is a rear elevation in section of the drill and seed spout.

By referring to the drawings it will be seen that the shoe or furrow opener 5 is straight and elongated, so that it may be conveniently sharpened, the sides of the shoe being smooth to prevent the dirt from becoming clogged thereto. The front of the shoe has transverse orifices 6, by which it may be conveniently secured to any machine. The bottom of the rear of the shoe is bent to one side, forming the flare 7. The seed spout 8 is secured to the shoe 5 at the other side, and above, the flare 7. This seed spout extends below the horizontal plane at the top of the flare 7, and the bottom of its outer side 9 is bent inwardly to form a flange 10, for directing the seed below the flare 7 of the shoe. The front portion 11 at the bottom of the seed spout 8 is closed to prevent the dirt from entering the seed spout, while the rear portion 12 at the bottom of the seed spout 8 is open, to permit the escape of any dirt which may find its way into the seed spout from the opening 13 in its bottom, which permits the seeds which fall through the seed spout to pass laterally in the direction of and under the flared portion 7 of the shoe 5.

In using the invention a number of these shoes are provided, and they are mounted on a machine with their flared portions 7 disposed in opposite directions, so that the machine will not be forced laterally by the pressure against the flared portions of the shoes. As the machine is operated the shoe 5 will cut the ground, and the flared portion 7 of the shoe will raise the ground so that the seed which is conveyed by the seed spout will be directed by the flange 10 under the flared portion 7 of the shoe. After the seed has been directed by the flange 10 under the flared portion 7 of the shoe, the seed will be covered as the earth will fall to fill the openings made in the ground after the shoe has passed along, and the flare no longer supports the earth above the seed.

Having thus described my invention I claim as new and desire to secure by Letters Patent:

1. A drill shoe having a flare extending outwardly at one side for opening the ground and supporting the dirt while the seed is being planted, and a tubular seed spout secured to the other side of the drill shoe, with its bottom spaced from the bottom of the drill shoe, the bottom of the seed spout being opened at the side next the drill shoe with its other side bent substantially at the horizontal plane at the top of the flare to form a flange for directing the seed under the drill shoe.

2. A drill shoe having a flare extending outwardly at one side for opening the ground and supporting the dirt while the seed is being planted, and a tubular seed spout having an opening in its bottom at one of its sides, and with the bottom of its other side bent in the direction of its first-mentioned side, there being two alined slots in the seed spout at the first-mentioned side, in which the drill shoe above the flare extends, so that the bent side of the tubular seed spout which is spaced from the bottom of the drill and is disposed substantially at the horizontal plane at the top of the flare of the drill shoe will direct the seed under the top of the drill shoe flare.

3. A drill shoe having a flare for opening the ground, a seed spout secured to the shoe and extending below the horizontal plane at the top of the flare, and with its bottom spaced from the bottom of the drill shoe, and a flange on the seed spout disposed substantially at the horizontal plane at the top of the drill shoe flare for directing the seed under the flared portion of the drill shoe.

4. A drill shoe having a flare at the bottom of its rear end, a seed spout secured to the shoe above the flare and extending below the horizontal plane at the top of the flare and spaced from the bottom of the said shoe, the seed spout having an opening in its rear to prevent the passages in the seed spout from becoming clogged, and a flange on the seed spout for directing the seed under the flared portion of the drill shoe.

5. A drill shoe having a flare for opening the ground, a seed spout secured to the shoe and extending below the horizontal plane at the top of the flare, there being an opening in the side of the seed spout in the direction of the flare which is continued rearwardly, and a flange on the seed spout substantially at the horizontal plane at the top of the flare for directing the seed under the flared portion of the drill shoe.

In testimony whereof I have signed my name to this specification in the presence of two subscribing witnesses.

FRANK KERIAN.

Witnesses:
  FRANK J. KERIAN,
  JAMES S. CASEY.

---

Copies of this patent may be obtained for five cents each, by addressing the "Commissioner of Patents, Washington, D. C."